United States Patent [19]
Blankenburg et al.

[11] Patent Number: 5,242,735
[45] Date of Patent: Sep. 7, 1993

[54] STRUCTURAL MODULE

[76] Inventors: Karl Blankenburg, 32131 Claeys Dr., Warren, Mich. 48093; Karl V. Blankenburg, 61830 Lantern Cove, Washington, Mich. 48094

[21] Appl. No.: 780,097

[22] Filed: Oct. 17, 1991

[51] Int. Cl.⁵ ............................................. B32B 3/12
[52] U.S. Cl. .................................... 428/116; 428/178
[58] Field of Search ............... 428/116, 178, 117, 118

[56] References Cited

U.S. PATENT DOCUMENTS

| | | | |
|---|---|---|---|
| 2,644,777 | 7/1953 | Havens | 428/116 |
| 2,831,688 | 4/1958 | Knox | 428/119 X |
| 2,992,151 | 7/1961 | Niessen | 428/133 |
| 3,366,530 | 1/1968 | Kodich | 428/116 |
| 3,432,859 | 3/1969 | Jordan et al. | 428/116 X |
| 3,461,632 | 8/1969 | Kuhne | 428/116 X |
| 3,525,663 | 8/1970 | Hale | 428/179 |
| 3,616,025 | 10/1971 | Fairbanks | 428/116 X |
| 3,617,416 | 11/1971 | Kromrey | 428/117 X |
| 3,673,057 | 6/1972 | Fairbanks | 428/116 |
| 3,775,234 | 11/1973 | Rich | 428/178 X |
| 3,876,492 | 4/1975 | Schott | 428/178 X |
| 3,983,283 | 9/1976 | Bagley | 428/116 |
| 4,049,855 | 9/1977 | Cogan | 428/116 |
| 4,136,846 | 1/1979 | Brault | 244/123 |
| 4,374,440 | 2/1983 | Drapkin | 52/806 X |
| 4,906,508 | 3/1990 | Blankenburg et al. | 428/116 |
| 5,030,501 | 7/1991 | Colvin et al. | 428/178 |

*Primary Examiner*—Henry F. Epstein
*Attorney, Agent, or Firm*—Basile and Hanlon

[57] ABSTRACT

A structural module includes a plurality of hollow cells having flat top ends, opposed open ends and side walls extending between both ends. The flat top ends are arranged in a first plane. Flat portions formed adjacent to the open ends of the cells are arranged in a second plane spaced from the first plane. The cells are arranged in adjacent parallel rows, with the side walls of cells in one row being co-linearly aligned with the side walls of cells in an adjacent row in a plane disposed at an acute angle with respect to the rows of cells.

13 Claims, 6 Drawing Sheets

STRUCTURAL MODULE

BACKGROUND OF THE INVENTION

1. Field of the Invention

The present invention relates, in general, to structural modules or panels and, more particularly, to structural modules or panels formed of interconnected cells of predetermined shapes.

2. Description of the Art

Various cellular or honeycomb structures have been developed for use in aircraft, housing, shipping containers, trailers and vehicles. Such structures provide a strong, lightweight module or panel which can be formed in many different configurations and shapes for such various applications. These cellular elements have been constructed in various geometric shapes and in planar or stacked arrangements depending upon impact and shear strength requirements as described in U.S. Pat. No. 4,906,508 issued in the names of the present Applicants.

As described in that patent, the geometric cell designs lend themselves to contour shapes to conform to the requirements of the final product, such as vehicle doors, decks, hoods and other vehicle body parts. Typically, a solid, thin, outer skin panel is joined to one or both sides of the cellular structure. Further, one or both outer skin panels and one or both sides of the inner cellular structure may be contoured depending upon the particular application.

It has been found that certain cellular arrangements provide high impact strength in one direction or axis along the structure, but have far less strength in an opposite direction or along an opposite axis. Thus, unless the cellular structure is increased in thickness along the weaker direction or axis, such cellular structures are limited to only certain low impact force applications or applications involving unidirectional forces.

Thus, it would be desirable to provide a structural module which overcomes the deficiencies noted in previously devised structural modules or panels. It would also be desirable to provide a structural module which can be easily and uniformly constructed with high impact strength along all axes. It would also be desirable to provide a structural module which can be constructed with a variety of different geometric, cellular configurations for use in various applications. It would also be desirable to provide a structural module whose configuration can be easily modified to provide additional strength and impact force resistance along any axis.

SUMMARY OF THE INVENTION

The present invention is a structural module which includes a plurality of integrally joined cells formed as hollow enclosures. Each cell has a flat top end, an opposed open end and side walls extending between both ends. The flat top ends of the cells are co-planarly arranged in a first plane of a predetermined shape. A plurality of flat portions are integrally joined to the side walls of the cells adjacent to the opposite ends of the cells. The flat portions are arranged in a second plane of predetermined shape spaced from the first plane. The top ends of the cells are arranged in parallel rows, with one cell in one of the rows being co-linearly aligned with one cell in an adjacent row at an acute angle with respect to the axis of each row of cells. One edge of one cell in one row is integrally joined to one edge of a cell in an adjacent row to provide a rigid structural module or panel.

Preferably, the cells in one row are linearly offset from the cells in the two opposite adjacent rows. The side walls of cells in adjacent rows are integrally joined together at adjacent edges so as to extend co-linearly in a common plane which is disposed at an acute angle with respect to the longitudinal axis of the rows of cells. This provides high impact strength as forces impacting on the structural module in any direction or at any angle are evenly distributed through the co-planar, aligned side walls of the cells throughout the entire structural module. In a preferred embodiment, in all geometric configurations of the present structural module, the flat top ends of each of the cells are closed and have a smaller diameter or width than the opposed open ends of each cell such that the side walls of each cell taper angularly outward from the top end to the opposed open end in a truncated, pyramidal form.

In an alternate embodiment, the side wall edges of all of the cells are integrally connected to side wall edges of cells in adjacent rows to provide a unitary structure having high impact strength. In one embodiment, the flat top ends are arranged in a first series of rows and the flat portions are arranged in a second series of rows adjacent to and parallel to the first series of rows. In another embodiment, the flat top ends are arranged in a first series of rows and the flat portions are disposed in the first series of rows between the flat top ends of each cell.

Ribs of any selected height may be integrally joined to the juncture of certain side walls or edges of side walls of the cells to increase the strength and impact force resistance of the structural module. The ribs which may extend from the juncture points up to the flat top ends or opposed flat portions of the structural module may be provided in any desired configuration depending upon the needs of a particular application. The ribs may be added to all or only a portion of the cells on one side of the structural module, such as the side containing the flat top ends of the cells. Alternately, ribs of the same or different configuration as that on the side described above may be provided on the opposed side of the structural module between adjacent flat portions.

Finally, any of the geometric structures employed in the structural module of the present invention may be provided with cutout areas in some or all of the flat top closed ends, the side walls and various interconnecting webs extending between spaced side wall edges to provide a lighter weight structural module while still retaining the high impact strength resistance and force distribution features of the structural module of the present invention.

The structural module of the present invention overcomes many of the problems encountered with previously devised structural modules in that the specific geometric arrangement of cells provides high impact strength along both major axes of the structural module by uniformly distributing forces impacting at any angle on the panel across the entire panel through the aligned and interconnected arrangement of the side walls of the cells. The cells may be provided in various geometric forms, such as one of many different truncated polygonal shapes, to meet the strength needs of various applications. Further, cutout areas may be formed on the side walls, the closed top ends and/or the interconnecting webs between certain cells to substantially reduce the weight of the structural module; while retaining the high impact strength and even force distribution features thereof.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
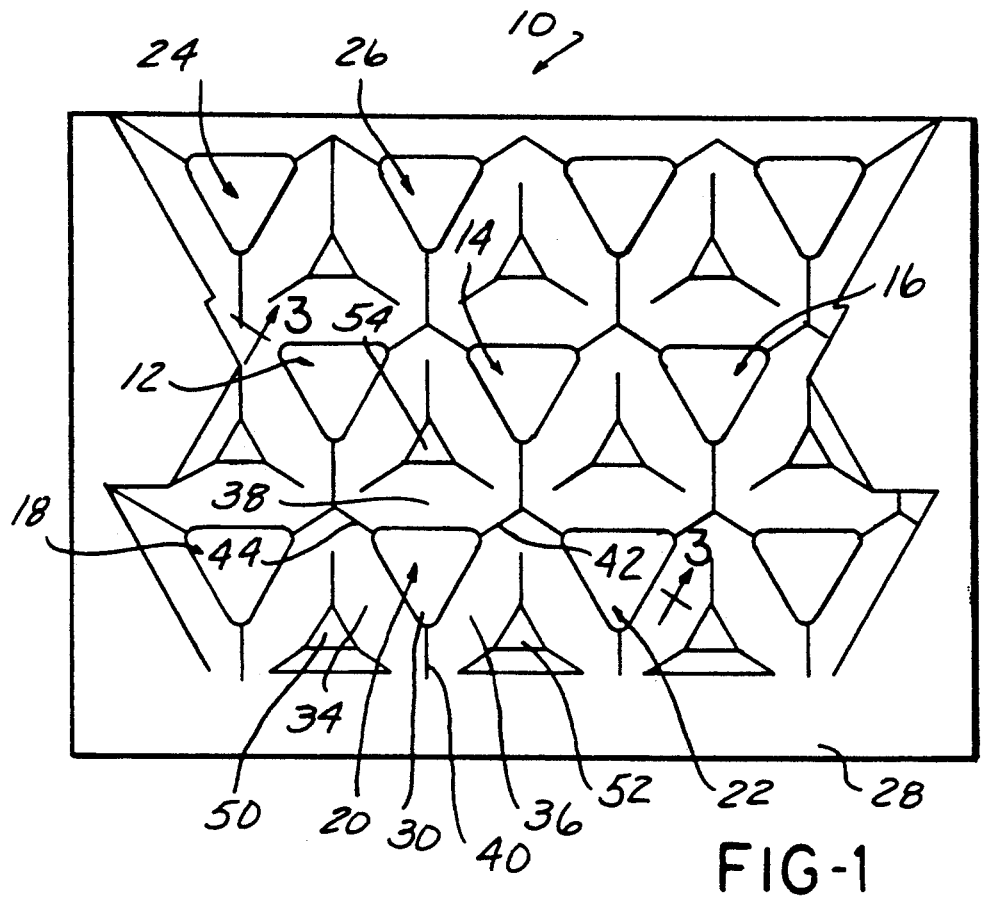
FIG. 1 is a plan view of one surface of a first embodiment of a structural module of the present invention.

In the present invention, as shown in FIGS. 1-14, a structural module is depicted which has high impact strength along both major axes regardless of the direction or angle of impact of a force on the structural module.

Each structural module, as described hereafter in various embodiments, includes a plurality of integrally joined cells formed as hollow enclosures. Each cell has a flat top end, an opposed open end and side walls extending between both of the ends.

The structural module is formed of any suitable material capable of being formed to the shape described hereafter. Thus, various metals, such as aluminum, steel, etc., may be employed to form the structural module of the present invention. Alternately, cardboard, pressed wood composites, etc., may also be employed. In the case of metals, cardboard, pressed wood composites, etc., such materials may be formed to the desired configurations described hereafter by a variety of conventional processes, such as forming, stamping, bending, etc.

Many different plastics may also be employed to form the structural module of the present invention. Preferably, a high impact resistant plastic with good pre-mold flow characteristics is employed to form the structural module. Thermosetting or pressure setting plastic materials may also be employed. The structural module of the present invention may be formed by any currently available molding process including pressure form, thermoform, injection molding, blow molding, etc.

A general description of the characteristics and functional aspects of the structural module of the present invention will be provided in conjunction with various embodiments or examples. A first embodiment of a structural module 10 is shown in FIGS. 1-4.

The structural module 10 includes a plurality of integrally joined, hollow cells, such as cells 12, 14, 16, 18, 20, 22, 24 and 26. As each of the cells is identically constructed, only the structure of one of the cells, such as cell 20, will be described in detail hereafter. It will be understood that the other cells are similarly constructed. It will also be noted that all of the cells are surrounded by an optional peripheral, planar edge portion 28 which defines a peripheral edge for the entire structural module 10.

The cell 20 may have any regular pyramidal shape. As used herein, the term "regular" is to be understood as meaning a cell having a base substantially perpendicular to its longitudinal axis whereby the cell has a substantially consistent shape at any perpendicular cross section and wherein each cross section is centered on the longitudinal axis of the cell. The term "pyramidal" means any body tapered toward an apex from a base, regardless of whether the base is formed as a simple or complex polygon, such as a triangular, square, rectangular, pentagonal, hexagonal, octagonal, etc., polygon, or a rounded or circular figure. The taper is preferably consistent along the length of the cell from one end to the other. One end of each cell is preferably truncated to form a flat end surface, as described hereafter.

The cell 20 has a flat, top end 30, and an opposed, open end 32 spaced from the top end 30. The top end 30 and the open end 32 project outwardly in opposite directions from the planar, peripheral edge portion 28 of the structural module 10. It will be understood that the term "top" is used solely with the orientation of the structural module shown in FIG. 1. The flat top end 30 could equally be disposed on the bottom of the module 10 in a particular application.

The cell 20 includes side walls which, in the triangular embodiment shown in FIGS. 1-4, include side walls 34, 36 and 38 which extend between the top end 30 and the open end 32. As the cell 20 has a pyramidal shape, the side walls 34, 36 and 38 taper outwardly from the top end 30 to the opposed, open end 32. This tapered shape is selected to provide a mold draft angle as well as to utilize less material in forming each cell.

The boundaries of the side walls 34, 36 and 38 are integrally joined to form side edges 40, 42 and 44.

The cells are arranged in parallel rows extending along one axis of the structural module 10. Thus, cells 12, 14 and 16 are arranged in a first row, cells 18, 20 and 22 are arranged in a second, parallel row and cells 24 and 26 are arranged in a third row, adjacent and parallel to the first row. However, the cells in each of the rows are staggered or linearly offset along the length of the structural module 10 from an adjacent cell in one of the adjacent rows of cells. Thus, the cell 20 is linearly offset along the longitudinal axis of the structural module 10 from the cells 12 and 14 in the first row. Cells 24 and 26 in the third row are linearly offset from cell 12 in the first row. However, the side walls of each of the cells, due to the staggered, offset arrangement of the cells in parallel rows, are co-linearly aligned in a row or plane extending at an acute angle with respect to the axis of the parallel rows of cells. In this arrangement, adjacent side wall edges of adjacent cells, such as cells 14, 20 and 22, and 12, 18 and 20 are interconnected as part of the integral construction of the structural module 10. Likewise, adjacent side walls, such as side walls 36 of the cell 20 and the corresponding side wall of the cell 14, are arranged in a co-linear, plane which is disposed at an acute angle with respect to the longitudinal axis or rows of cells.

Flat portions or areas, such as flat portions 50, 52 and 54 are integrally joined with the side walls of each of the cells and are disposed adjacent to the open ends 32 of the cells, such as the open end 32 of the cell 20. In the first embodiment shown in FIGS. 1–3, the apex or ends of the flat portions 50, 52 and 54 are cut away to form an aperture. It will be understood that the flat portions, which are arranged in a plane spaced from the plane of the flat, top ends 30 of the cells, may likewise be formed as a closed end, similar to that of the top ends of each of the cells.

Figure 5:
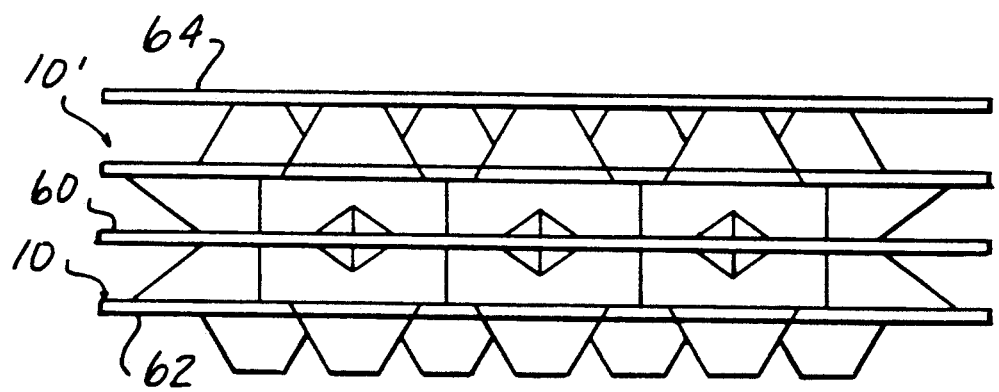
FIG. 5 is a side elevational view of the first embodiment shown in FIGS. 1–4, but illustrated in a multi-panel, stacked configuration.

The flat portions 50, 52, 54, etc., are arranged in a plane which may be linear or curved, depending on the application, for mounting to a support structure or to skin panel, as shown in FIG. 5. Likewise, the flat top ends 30 of each of the cells are arranged in a separate plane, which may also be linear or curved in the same shape or a different shape as the plane formed by the flat portions. The planar arranged flat top ends 30 are also configured for receiving a planar skin panel or for attachment to a support structure.

As shown in FIG. 5, a first structural module 10 is provided with a first skin panel 60 integrally joined to the flat top ends of each of the cells therein and a second, opposed skin panel 62 integrally joined to the flat portions of the cells in the structural module 10. The skin panels 60 and 62 may comprise thin sheets which are integrally molded to the cells of the structural module 10 via suitable means, such as sonic welding, vibration welding, heat welding, adhesive bonding, etc. As noted above, each of the skin panels 60 and 62 may be planar or curved depending on the shape of the cells. This configuration also lends itself to a stacked arrangement shown in FIG. 5 in which two substantially identical, but inverted structural modules 10 and 10' are stacked one above the other with an intermediate skin panel 60 disposed therebetween. An outer skin panel 62 attached to the structural module 10 and an additional outer skin panel 64 attached to the structural module 10' may also be provided. This stacked arrangement provides increased rigidity along any axis or direction of the structural module. The cells in each layer of the stacked arrangement shown in FIG. 4 may be identically arranged and oriented from layer to layer or the cells may be inverted from the cells in the adjacent layers, i.e., top end to top end, depending upon the strength requirements of a particular application.

Figure 7:
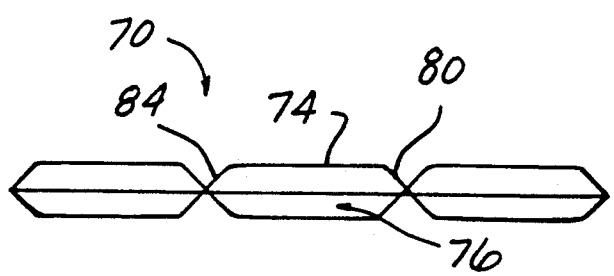
FIG. 7 is an end view of the structural module shown in FIG. 6; 10
Figure 8:
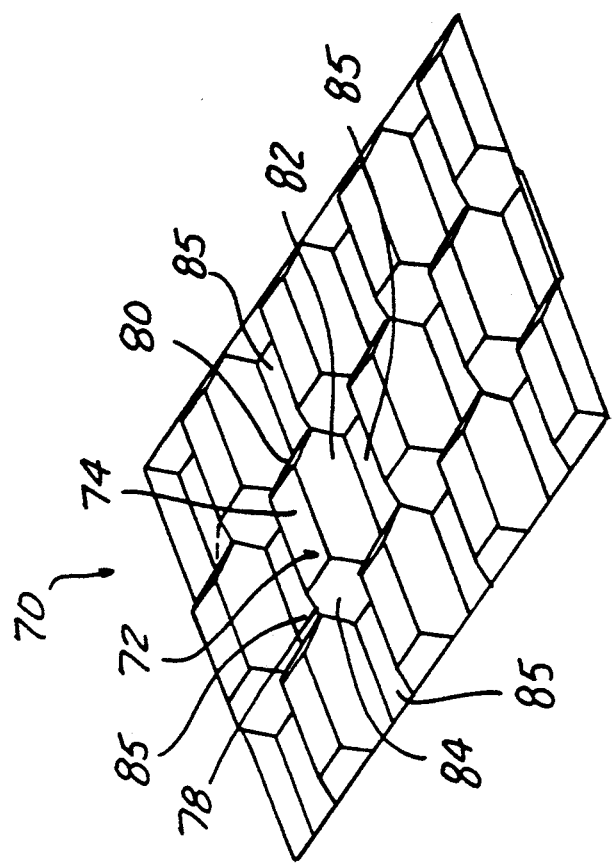
FIG. 8 is a perspective view of the structural module shown in FIG. 6.
Figure 6:
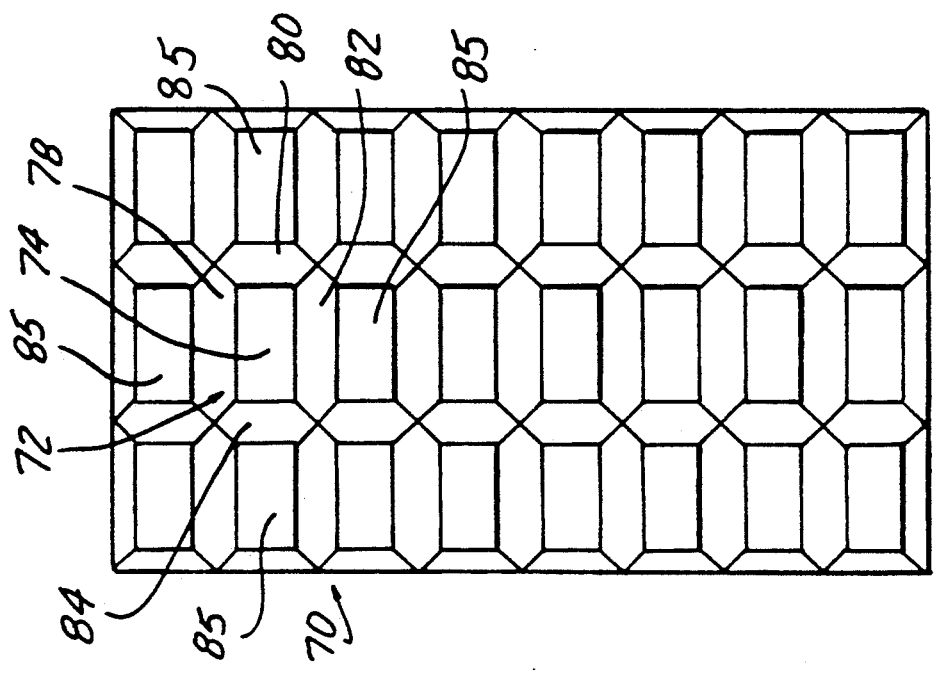
FIG. 6 is a plan view of a second embodiment of a structural module of the present invention.

Another embodiment of the present invention is shown in FIGS. 6, 7 and 8. In this embodiment, the structural module 70 is provided with a plurality of cells having a truncated, rectangular, pyramidal shape. Thus, each of the identical cells, such as cell 72, includes a flat top end 74, an opposed open end 76 and tapering, inclined side walls 78, 80, 82 and 84.

Flat portions are formed adjacent to the edges of the open ends 76 of each cell 72. The flat portions, such as the flat portions denoted by reference number 85, are arranged in a second plane spaced from a first plane formed by the closed top ends 74 of each of the cells 72. This arrangement provides an alternating up and down configuration across the length and width of the structural module 70. The closed top ends 74 of each of the cells are arranged in a first plane, while the opposed flat portions 85 are arranged in a spaced plane, either of which may be linear or curved. The planar flat portions and the flat top ends on either side of the structural module 70 enable thin skin panels or sheets, such as that shown in FIG. 5 and denoted by reference numbers 60 and 62, to be applied to one or both sides of the structural module 70 to complete the structural module 70 and to provide a convenient attachment point for mounting the structural module 70 to a support structure, such as a vehicle door, etc.

Figure 9:
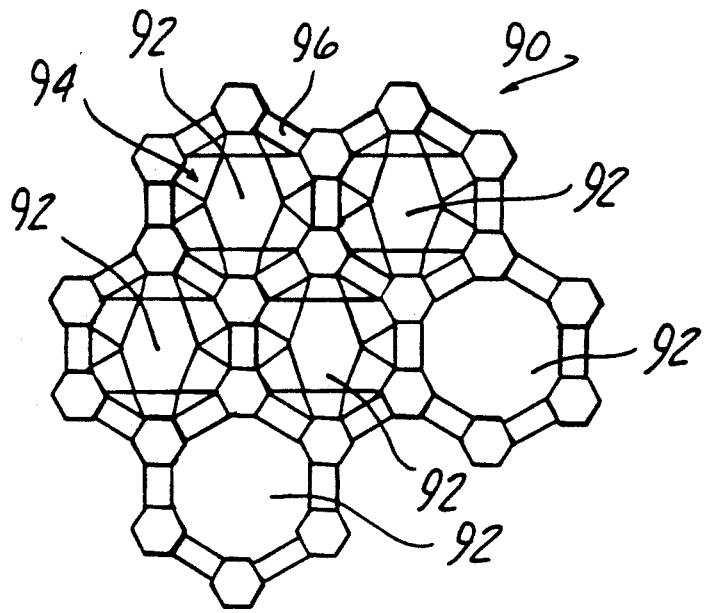
FIG. 9 is a partial, plan view of a third embodiment of a structural module of the present invention.
Figure 10:
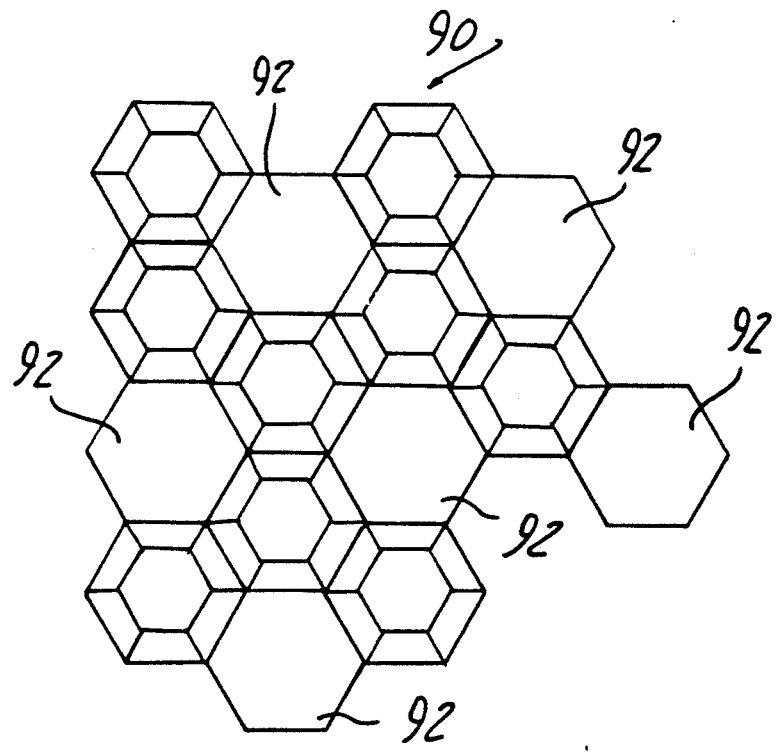
FIG. 10 is a partial bottom view of the third embodiment shown in FIG. 9.

A honeycomb arrangement for a structural module 90 is shown in FIGS. 9 and 10. In this embodiment, each of the cells has a closed top end denoted by reference number 92, an opposed open end denoted by reference number 94 in FIG. 9 for one of the cells, and tapering side walls arranged in a polygonal shape. Due to the exemplary hexagonal shape of each of the cells shown in FIGS. 9 and 10, the side walls have generally triangular or trapezoidal shapes and extend angularly from the closed top end 92 toward the open end 94.

In this embodiment, certain edges of each of the cells arranged in aligned, parallel rows are integrally joined to edges of adjacent cells in adjacent rows. Enlarged webs or ribs, such as web 96 shown in FIG. 9, are integrally formed between certain of the side wall edges of the cells to provide increased strength and rigidity to the structural module 90. The webs or ribs may be provided on one or both sides of any structural module of the present invention. Further, such webs or ribs may be provided on the entire portion of the structural module or only on certain areas or along certain axes depending upon the requirements of a particular application. Each web may have a variety of shapes, such as a tapered, two-sided member, or a triangular member with a peaked or flat top.

Each web or rib is integrally formed to the cells, such as by stamping, molding, forming, etc., and is located above the juncture of two side walls or side wall edges of two cells in adjacent rows of cells. Each web or rib may have any predetermined height so as to extend upward from the side wall juncture to a predetermined height. However, the height of the webs or ribs does not extend past the flat, top end of each of the cells. Such webs or ribs may also be provided on the opposed surface of any structural module of the present invention between certain side walls or side wall edges of the flat portions of adjacent cells and between the flat portions within a cell.

Figure 2:
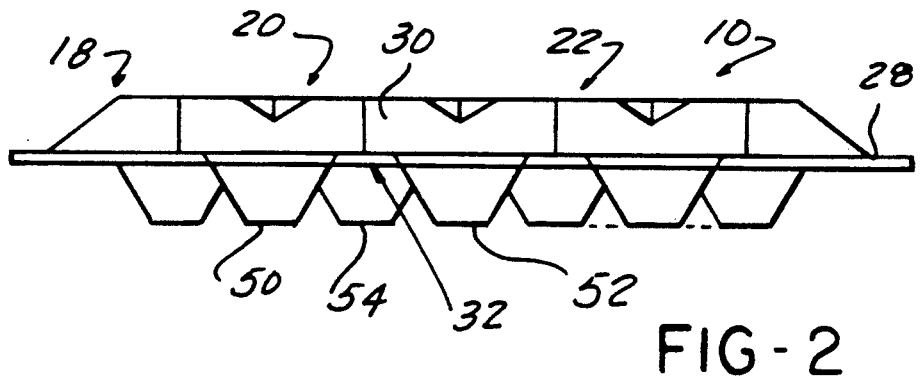
FIG. 2 is a side elevational view of the structural module shown in FIG. 1.
Figure 3:
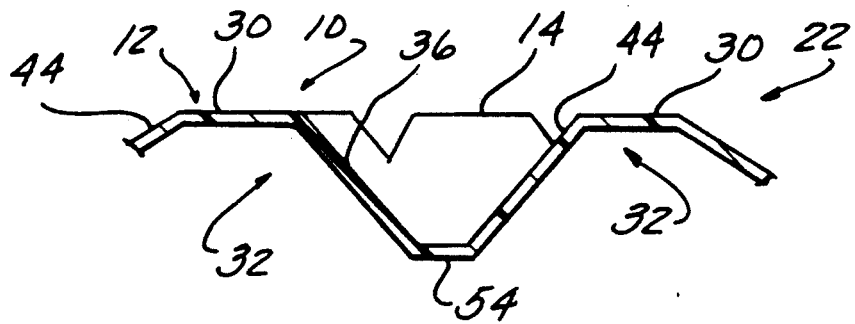
FIG. 3 is a cross sectional view generally taken along line 3—3 in FIG. 1.
Figure 4:
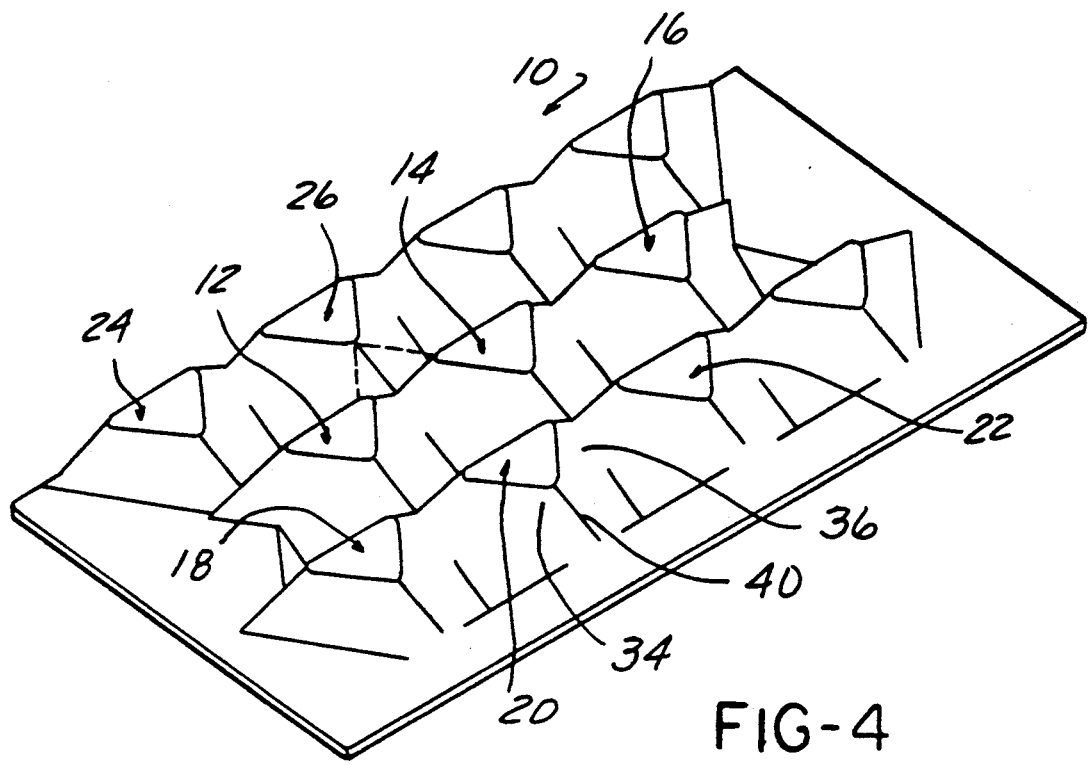
FIG. 4 is a perspective view of the structural module shown in FIG. 1.

For example, the dotted lines in FIGS. 2 and 4 show possible locations for webs in the structural module 10. The dotted line in FIG. 8 denotes a potential location for a web in the module 70, with additional webs extending between other spaced edges of adjacent cells.

As in the other embodiments, the top ends 92 of the structural module 90 are arranged in a first plane and the open ends 94 are arranged in a second, spaced plane which may each be linear or curved or in the same or different configurations. This arrangement allows for the attachment of thin skin panels to the cells as described above and shown in FIG. 5.

Figure 11:
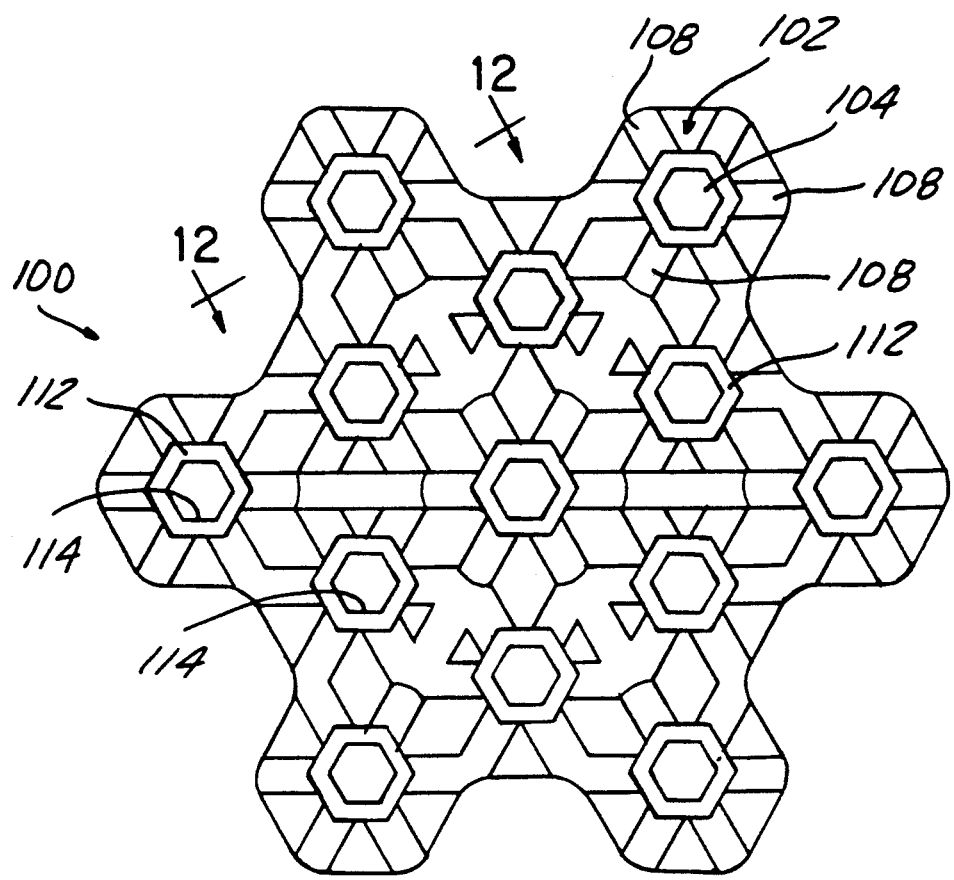
FIG. 11 is a partial plan view of a fourth embodiment of the present invention.
Figure 12:
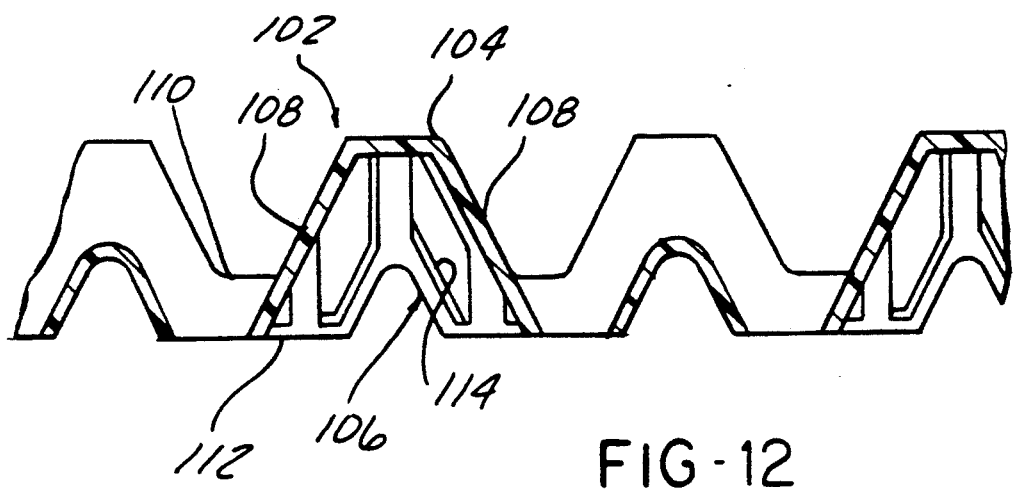
FIG. 12 is an enlarged, cross sectional view generally taken along line 12—12 in FIG. 11.
Figure 13:
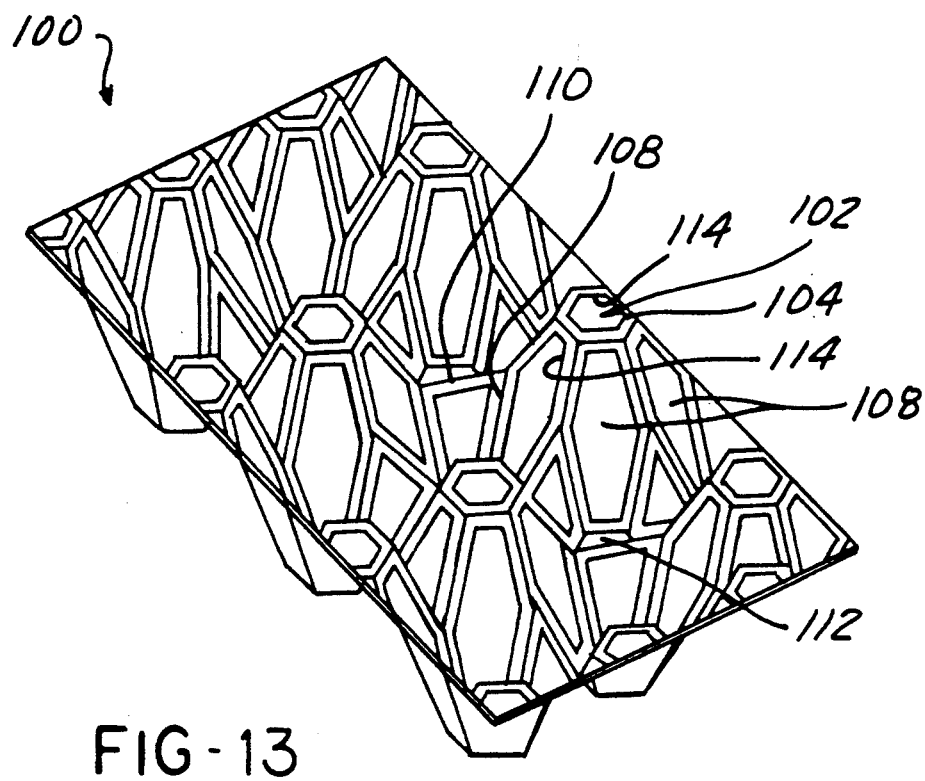
FIG. 13 is a perspective view of the fourth embodiment shown in FIG. 11.

Yet another embodiment of the present invention is shown in FIGS. 11, 12 and 13. In this embodiment, a structural module 100 includes a plurality of cells arranged in spaced, parallel rows, with the cells in each row being staggered or linearly offset from the cells in adjacent rows. The cells, such as cell 102, has a generally hexagonal cross section with a flat top end 104, an opposed, open end 106 and tapering side walls all generally denoted by reference number 108 extending therebetween. The side walls 108 of each cell are connected to the side walls of adjacent cells at common juncture points. Web portions 110 which are integrally formed with each of the cells also extend between certain side walls of adjacent cells. The web portions 110 extend a predetermined distance away from flat portions 112 formed between each of the cells and are spaced from the flat top ends 104 of each of the cells.

As with the other embodiments of the structural module of the present invention, the flat top ends 104 and the flat portions 112 are arranged in spaced planes which may be directly attached to surrounding structure or provided with an overlaying, integrally formed skin panel or sheet, as described above.

In this embodiment, as shown in detail in FIGS. 11, 12 and 13, certain portions of the top ends 104, side walls 108 and web portions 110 are cutout, as shown by reference number 114, which extend therethrough and eliminate material and weight from the overall structural module 100. This provides a significant reduction in the overall weight of the structural module 100; while retaining the desired structural integrity and high impact force resistance and uniform force distribution described above.

The cutout portions may be provided on any embodiment of the structural module of the present invention. In the case of molded plastic structural modules, the cutout portions are formed during the molding process of the structural module. When a metallic material, cardboard or pressed wood composite is employed to form the structural module, the cutout portions are formed by piercing, stamping, etc., during the formation of the structural module.

Figure 14:
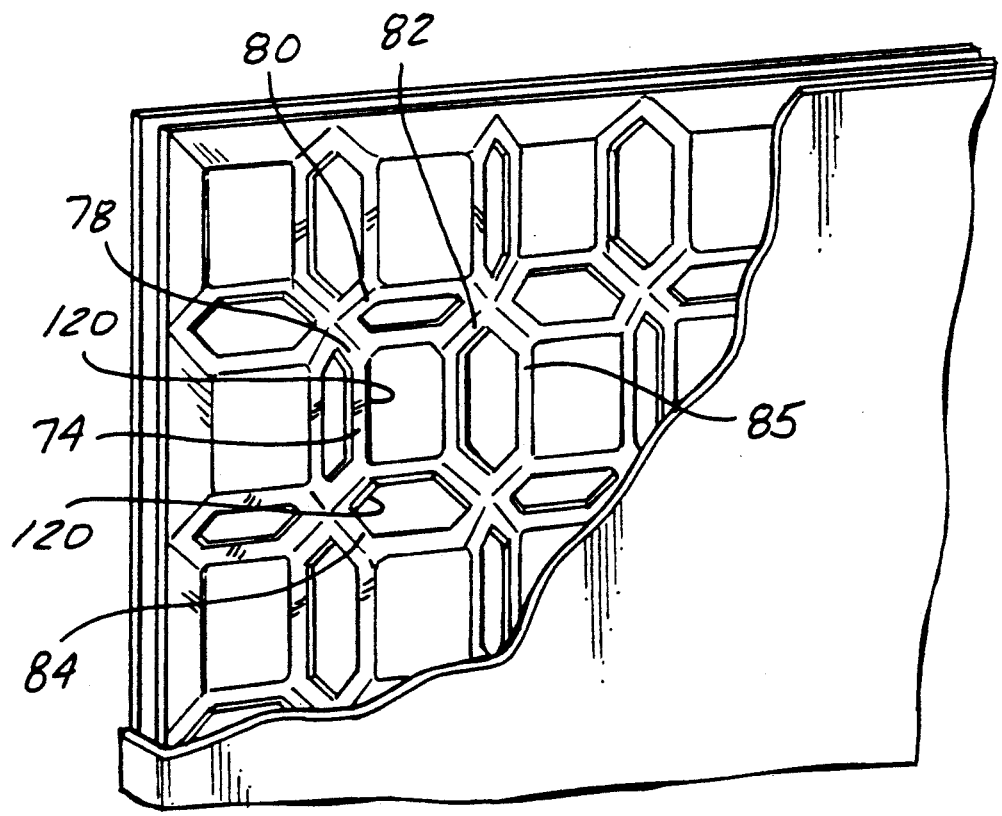
FIG. 14 is a perspective view of a modification to the structural module shown in FIG. 6.

For example, FIG. 14 depicts cutout portions 120 in the top ends 74, side walls 78, 80, 82 and 84, and flat portions 85 of the structural module 70. Similar cutouts may also be made to the structural modules 10 and 90 described above.

In summary, there has been disclosed a unique structural module which provides higher impact force resistance regardless of the direction of force impinging on the structural module. The structural module can be formed of any one of a number of different geometric-shaped cells which are arranged in parallel rows, with the cells in each row being offset or staggered from the cells in adjacent rows, but connected together at certain edges to align the side walls of the cells in adjacent rows to provide even force distribution across both major axes of the structural module.

We claim:
1. A structural module comprising:
 a plurality of integrally joined cells each formed as hollow enclosures, each cell including a flat top end, an opposed open end and planar side walls extending between the top and open ends;
 the flat top ends of the cells being co-planarly arranged in a first plane of predetermined shape;
 a plurality of flat portions integrally joined to the side walls of the cells adjacent to the open ends of the cells, the flat portions being arranged in a second plane of predetermined shape spaced from the first plane;
 the top ends of the cells being arranged in parallel rows each including a plurality of cells, with each cell in each row being co-linearly aligned with at least one cell in the adjacent row at an acute angle with respect to the axis of each row of cells; and
 an edge of each of the cells formed by the juncture of adjacent side walls of each cell being integrally joined to an edge of a cell in an adjacent row at a point located between the flat top ends and the flat portions of the cells.

2. The structural module of claim 1 further comprising:
 integrally joined webs extending between the joined edges of certain of the side walls of certain cells and extending upward from the joined edges toward the flat top ends of the cells.

3. The structural module of claim 1 wherein:
 the flat tops are arranged in a first series of rows; and
 the flat portions are arranged in a second series of rows adjacent and parallel to the first series of rows.

4. The structural module of claim 1 wherein:
 the flat tops of the cells are arranged in a first series of rows; and
 the flat portions are arranged in the first series of rows between adjacent flat tops of the cells.

5. The structural module of claim 1 wherein:
 certain portions of at least one of the side walls, the flat top ends of the cells, and the flat portions between the cells include cut out portions devoid of material.

6. The structural module of claim 1 wherein the flat top ends are closed.

7. The structural module of claim 1 wherein:
 each cell has a regular pyramidal shape.

8. The structural module of claim 1 wherein the structural module is formed of molded plastic.

9. The structural module of claim 1 wherein the structural module is formed of a formed metallic material.

10. The structural module of claim 1 wherein:
 another planar arrangement of integrally joined cells is joined adjacent to the plurality of integrally joined cells.

11. The structural module of claim 10 further comprising:
 a planar sheet arranged between and joined to the planar, adjacent arrangement of cells.

12. A structural module comprising:
 a plurality of integrally joined cells each formed as hollow enclosures, each cell including a flat top end, an opposed open end and planar side walls extending between the top and open ends;
 the flat top ends of the cells being co-planarly arranged in a first plane of predetermined shape;
 a plurality of flat portions integrally joined to the side walls of the cells adjacent to the open ends of the cells, the flat portions being arranged in a second plane of predetermined shape spaced from the first plane;
 the top ends of the cells being arranged in parallel rows each including a plurality of cells;
 an edge of each of the cells formed by the juncture of adjacent side walls of each cell being integrally joined to an edge of a cell in an adjacent row at a point located between the flat top ends and the flat portions of the cell; and
 the cells in one row being linearly offset from the cells in adjacent rows such that the side walls of the cells in adjacent rows are integrally connected together at edges and extend co-linearly in a common plane disposed at an acute angle to the longitudinal axes of the parallel disposed rows of cells.

13. The structural module of claim 12 wherein:
 each cell has a regular pyramidal shape.

* * * * *